Jan. 12, 1943.    J. T. R. McCORKLE ET AL    2,308,294
LINING OF IRRIGATION DITCHES
Filed July 11, 1938    2 Sheets—Sheet 1
Fig. 1
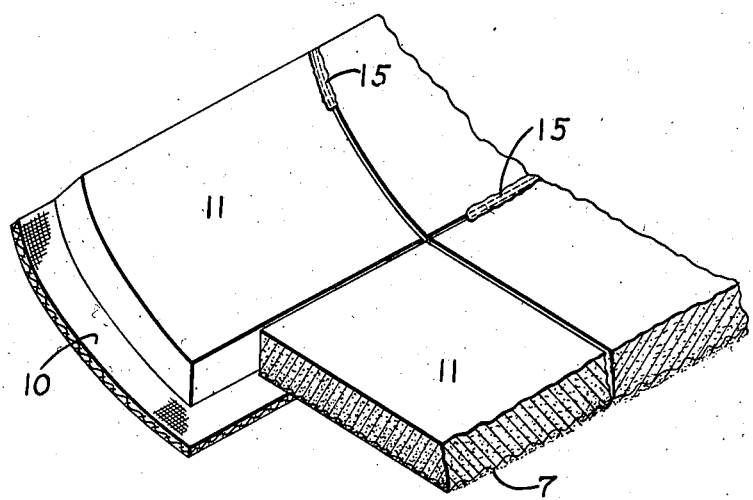
Fig. 2
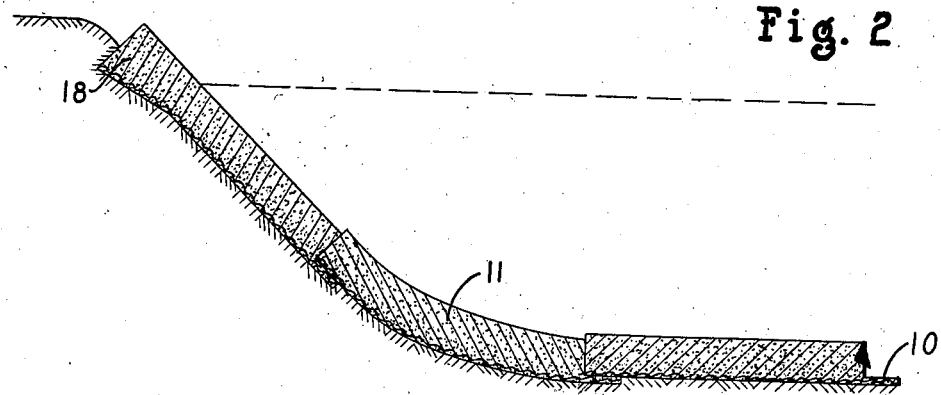
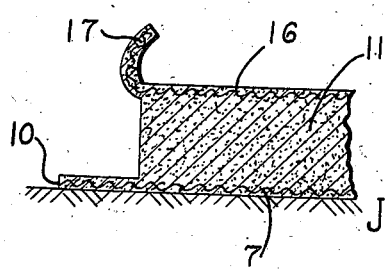
Fig. 3
John T. R. McCorkle — Edwin V. Berg    Inventors
By Charles L. Reynolds
            Attorney Jan. 12, 1943.   J. T. R. McCORKLE ET AL   2,308,294
LINING OF IRRIGATION DITCHES
Filed July 11, 1938   2 Sheets-Sheet 2

John T. R. McCorkle – Edwin V. Berg   Inventors
By Charles L. Reynolds
Attorney

Patented Jan. 12, 1943

2,308,294

UNITED STATES PATENT OFFICE 2,308,294

LINING OF IRRIGATION DITCHES

John T. R. McCorkle, Boise, and Edwin V. Berg, Idaho Falls, Idaho

Application July 11, 1938, Serial No. 218,518

11 Claims. (Cl. 61—7)

There are many ditches, canals, and similar artificial waterways throughout the arid portions of the country. These are of various types, some temporarily constructed and some constructed more permanently, but all give rise to certain problems that have not hitherto been solved.

Principal among these problems is the matter of leakage. Leakage arises from faulty construction or failing materials, from the porosity of soil in which the unprotected ditch is cut, from burrows and the like formed by earth-boring animals, from damage caused by cattle, and from various other causes. Such leakage is costly, not only because of the value of the water which is thus lost and the possible lack of sufficient water delivered at the place where it is needed, but for other reasons. It tends to water-log the ground immediately adjacent the leak and to cause a marshy condition, which is harmful to any crops or trees growing nearby; it tends to leach values and necessary salts from the soil, and it promotes rank growth of undesired weeds, grasses, and the like. Leakage, even though small in amount, promotes the growth of weeds adjacent the ditch where they are difficult to control. Even though the loss by leakage at any one point is minor in amount, the aggregate, continued day by day, means a loss of an appreciable amount of water which might otherwise be supplied to crops that need it, and which might go to lessen the over-all cost of irrigation, which is high enough to be burdensome at the best.

Attempts have been made, of course, to prevent such leakage. Ditches are constructed of or lined with wood or metal, but these rot or rust, and eventually leakage ensues, and in addition such materials in usable form are comparatively expensive, delivered and installed in the ditches. Concrete has been used to line ditches, but is so expensive that its use is only feasible in large trunk ditches or canals, the cost of which is borne by central governmental agencies or by a large community. Moreover, concrete is subject to cracking and breakage under variable conditions of weather and water level, more especially as irrigated districts will frequently be subjected to freezing weather during the winter, when minute cracks become enlarged and result in the ultimate disintegration of the concrete lining, or in the necessity for continuous and frequent repairs. An asphaltic lining has been proposed for such ditches, but in order that it may be waterproof and permanent it must be made of dense, hard mastic having a high penetration test, and it has not been found practicable to spread such a mastic lining in the ditch and to roll it in situ with sufficient pressure that it may acquire the necessary density.

It must be borne in mind that an irrigation ditch is likely to be subjected in summertime to the intense action of the sun, at least on its edges above the water line; that the water level may vary with the water supply and with the use made of the water; that the temperature of the exposed portion and of the portion beneath the water level may vary by many degrees; that it is occasionally subject to the destructive action of stray cattle or herds of cattle trampling through it or into it. On the other hand, in the winter time it is subjected to the action of frost, snow, freezing of the water within the ditch, and the like, as well as some of the other hazards mentioned above. At any time it may be subjected to the hazard of lack of adequate support by reason of erosion of or burrowing in its earth banks. Repairs are not readily effected during the growing season, for the ditch is at such times full of water, which is necessary to the supply of the crop, and generally, therefore, repairs must wait until the fall, when the water is low and is no longer needed for the crops, but when the temperature is cool or cold.

The problems involved in the lining of such ditches, of a capacity to serve a few ranches, or perhaps part of the distribution system of a single ranch only, are quite different from the problems involved in the revetment of river banks. With river banks the problem is never to contain the entire volume, to line the channel from shore to shore, nor to prevent seepage and loss of water—as it is with such irrigation ditches. The problem is rather, with river banks, to place a protective mattress on banks and at bends where otherwise the scouring action of a strong current would tend to wash out the bank. It is the erosive action of a strong current that is guarded against by river revetments, and there is no attempt made—because obviously it is impossible—to completely contain the river, to prevent access of water beneath the mattress or revetment. So long as the tough revetment mattress is reasonably well interposed as a shield against the erosive action of strong currents at vulnerable spots, that is considered sufficient, in river revetment work, and because the destructive action of erosion—direct or indirect—is so expensive, the revetting of banks is justified, though still an expensive job requiring much equipment, labor, and engineering preparation. Such revetment projects are generally handled by the Federal Government, all the resources of which are available.

In lining irrigation ditches (excluding, possibly, trunk ditches installed and maintained under the auspices and with the financial backing of large communities) it is not feasible for financial reasons, when initially preparing the ditch nor when maintaining it, to expend appreciable sums for equipment, labor, or engineering; the ditch is not lined to prevent damage from strong, erosive currents, but to contain and conserve water, and to prevent seepage promoting undesired weed growth. The financial benefit of lining the ditch lies, therefore, not in preventing even greater loss or damage from erosion, but in delivering a higher percentage of the water where intended, and in avoiding expense for extermination of weeds. It follows that the lining must be installed and maintained by one or a few individuals, largely by hand labor and tools, without the benefit of engineering skill and equipment, and certainly without the benefit of large expenditures.

It is an object of our invention to provide a lining for ditches, canals and the like, which is particularly suited to the conditions met in such service, as is outlined above, in that it has the characteristics of permanence, durability, relatively low cost, ease of repair when necessary and under the conditions prevailing at the time when repairs can be made, capable of being handled by the men and equipment normally available for lining or repairing the ditches, thoroughly and completely water-proof, capable of being so formed as to deter the growth of weeds along the bank, and in general a lining which is particularly adapted to the purpose.

It is also an object of our invention to devise a method whereby such ditch lining, or the units from which it is built up, may be constructed cheaply and conveniently, and in such a way that the units may be made up during a slack season and stored, to be available for use when needed.

With these and other objects in mind, as will appear hereafter, our invention comprises the novel ditch lining as a whole, the novel elements whereof it is formed, and the novel process of constructing these elements, all as shown in the accompanying drawings, as will be described in this specification, and more particularly as defined by the claims terminating the same.

In the accompanying drawings we have shown our ditch lining element embodied in a form and assembled in a manner such as is at present preferred by us, and have diagrammatically illustrated the process of its manufacture, in a manner which is preferred by us, it being understood that various changes may be made in the form, composition and arrangement of the ditch lining elements, and in the steps of the process, without departing from the spirit of our invention, so long as such changes fall within the scope of the claims.

Figure 1 is a perspective view of several such elements in assembled relationship in a ditch, and Figure 2 is a transverse section of such a ditch, lined with these elements.

Figure 3 is a detail section of a slightly modified form of elements.

The lining material is essentially an asphaltic product or bitumen. Previously this basic material has been tried for lining ditches, but, as has been pointed out above, the difficulty with its use was that sufficient pressure could not be applied to it when spread upon the bank of the ditch and in the channel thereof to secure sufficient compaction of the material, and thereby to secure a sufficiently dense and water-proof lining. For one reason this is difficult because, due to the contour of the ditch channel and the small size thereof, and the slope of the banks, it was not possible (assuming the expense could be borne) to use a power roller, as might be possible in lining a large reservoir, nor was it possible to secure sufficient compaction with a hand roller. Moreover the soil in which the ditch channel is formed is generally insufficiently compacted to offer adequate resistance to a roller, so that even were it possible to employ a sufficiently heavy roller, the sub-soil would be so yielding that it would still be impossible, practically speaking, to secure adequate compaction. A ditch channel is not like a roadway nor a reservoir, nor yet a river bank, and can not be prepared with such care, if for no other reason than that the cost would be prohibitive. Therefore, while it is our intention to employ a bitumen as the primary coating and water-proofing lining of the ditch, this can only be accomplished by preparing that lining in such a manner as will now be disclosed, that is, by preparing preformed lining units and joining them together, but this in itself introduces other problems, the nature and solution of which will be brought out in detail hereafter.

For reasons which will appear hereafter the unit employed for lining the ditch is preferably formed of two parts, though in the process of manufactue these two parts become so bonded and united that the final unit, in condition for use, constitutes in effect a single unit or piece. This first or basic unit, then, in part partakes of the nature of a water-proof impervious film of soft bitumen, and in part partakes of the nature of an inelastic or inextensible, but flexible, reinforcing web. The web may be composed of various materials, as jute, hemp or cotton textiles, wire mesh, or even felt. Burlap has been found to be admirably suited to the purpose in that it is cheap, readily available, has adequate strength, is long-lasting under the conditions of use, and is not harmed by the process of manufacture.

Figure 4:
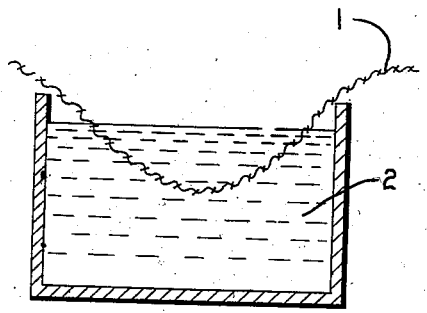
Figures 4, 5 and 6 are diagrammatic views in the nature of sections, showing successive steps in the process of manufacturing the ditch lining elements.

The first step in the process is to coat the web 1 (Figure 4) with a soft bitumen of high penetration test, which is liquid at a low temperature. Low temperature is necessary in order to avoid weakening or destroying the reinforcing web of burlap. If a different reinforcing web is used, as for instance a web of wire mesh, this factor is of less importance, though still it is preferred, for other reasons, that a soft bitumen of high penetration test be used. The coating may be accomplished by dipping the burlap into the hot bitumen, or in other ways than by dipping, as for instance by flowing on, spraying, or otherwise. It has been found that a bitumen or a cut-back asphalt having a penetration test of 150, or even up to 200, which is liquid at a temperature not exceeding 200° F., is well suited to the purpose, when the web is to be of burlap. Burlap is not injured by a temperature of 200° F.

Figure 5:
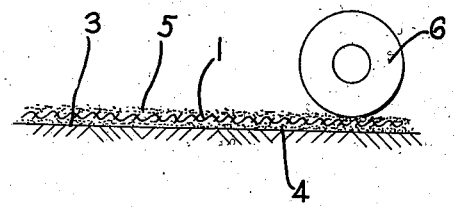

The reinforcing web of burlap having been coated in some suitable way, the coated burlap is immediately laid upon a flat surface 3, upon a layer of fine sand or aggregates spread upon such surface, as indicated in Figure 5 at 4. A similar layer 5 may be placed on the upper surface of the coated burlap, while the bitumen is still hot, or hot sand may be applied later. Whether the application of sand is accomplished first on one surface and then on the other, or simultaneously on both surfaces, the sand-coated burlap is rolled, as indicated by the roller 6, to force the sand into the bitumen, to take up all excess of bitumen; and to form a mastic on the opposite faces of the coated burlap in which the burlap is embedded. It would not be essential to coat one face of the burlap, though to do so makes it easier to handle the burlap and prevents its adherence when such is not desired. A prepared mastic might be employed, the principal object being to coat the web thoroughly, to water-proof it, with a bitumen that is not too hard and resistant to bending.

This completes the basic sheet, and the resulting product is a thin tensile layer which is flexible but inelastic and inextensible to any appreciable degree, which constitutes an impervious and water-proof sheet, which is coated on each face with mastic, and which is perhaps ⅛ inch thick, and weighs 5 to 8 pounds to the square yard.

Figure 6:
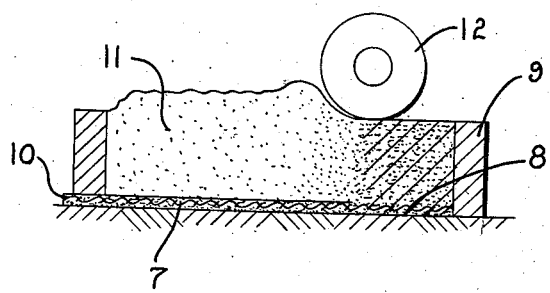

Such a sheet, indeed, might itself serve as a lining for the ditch, but in order to provide a more durable lining, especially to provide a lining which will resist destruction due to cattle and the like, and which may better bridge small faults in the channel beneath it, it is preferred that the unit be further processed. To this end the coated burlap sheet is cut into squares or other forms of suitable shape and size, and as is illustrated in Figure 6, such a square, designated as a whole by the numeral 7, is laid upon a flat surface 8, and within a form 9. Preferably the sheet 7 is not enclosed on all sides within the form 9, but a part thereof is left outside the form, as indicated at 10. Within the form 9, which is of suitable height, and above the sheet 7, is spread a layer of hot asphaltic material, such as mastic, indicated at 11. This is made up of an asphalt of low penetration test (between 30 and 100, depending on climatic conditions—70 has been used to advantage in tests) incorporating fine aggregates of the same nature as the aggregates at 4 and 5. The mastic, at a temperature of perhaps 325° F., and thus spread loosely, is now compacted, as by a roller 12 of adequate weight, until there is provided a dense, hard layer of asphaltic mastic above the sheet 7. By the process of rolling all voids in the mastic 11 are eliminated to as high a degree as possible, and a good bond is produced between this mastic 11 and the mastic coating on the adjoining face of the sheet 7, so that no line of cleavage appears between the mastic at 11 and the mastic coating 5 of the sheet 7.

The slabs or units thus formed are of such size as can be conveniently handled. They may be made up at any time, and stored for future use. They are formed and stored in flat condition. Each one is provided about at least half of its edges with an overlap 10, the purpose of which is to underlie and to form a water-tight joint with adjoining units when laid in the ditch.

The units may be used at any time, but as has been pointed out above, such lining or repairs thereto will normally be accomplished after the summer season is past and when the weather is comparatively cool, and the water in the ditch is low. Since the ditch channel is concave upwardly, it is necessary to bend some, if not all, of the lining units to fit the curvature of the channel or bank. The asphaltic material is used so that the lining may conform to the contours and curvatures of the bank and the unavoidable irregularities of the surface of the channel. However, since it is used to a large extent in cool or cold weather, and since asphalt, particularly when hard and tough and thick, tends to crack in such weather, and indeed to some degree in any weather, and since such cracks would destroy the impermeability of the lining, and open the way to leakage and to the destruction of the lining, it is essential that cracks be avoided when bending the units approximately to the contour of the channel.

It is to this end particularly that the reinforcing web is employed, and is incorporated as it is in what is to be the lowermost or bottom face of the lining. It is to this end in particular that the bitumen which coats the reinforcing web is a soft bitumen, readily flexible but cracking less readily than the more dense asphalt mastic which constitutes the upper layer, and being, in effect, self-mending. The reinforcing web in effect constitutes the axis for the maximum bending strain of the unit, and being located in the lower or convex surface of the unit, and incorporated therein, it insures that no part of the asphaltic material is subjected to excess tension stress, or to shear.

Figure 7:
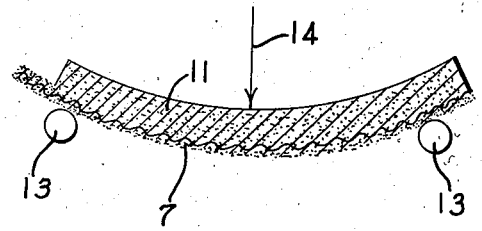
Figure 7 is a similar view showing the same being prepared for use.

The bending is accomplished in a manner analogous to that illustrated in Figure 7. The two edges of these slabs may be placed upon spaced apart supports 13, and a force applied, as indicated at 14, between the supports 13, with the result that the unit takes a curvature. The point of application and the amount of the force at 14 may be varied to effect such variation of the curvature as may be necessary. This step is readily accomplished in the field, without complicated tools.

The reinforcing web, then, prevents cracking of the dense mastic in the upper layer 11, since this cracking occurs only by reason of stresses of tension in the surface, and all the tension is taken by the reinforcing web 7 at the convex face of the unit. Should any incipient cracks occur, they are kept sealed by the soft mastic coating the reinforcing web, which is sufficiently soft and flexible that it will not crack in itself. Thus the units may be bent to any reasonable curvature without cracking, and under all conditions of weather or temperature.

The units are applied to the ditch channel one at a time. Preferably the units are rectangular, and on two sides the extension or flap 10 extends beyond the vertical edge of the upper layer 11. These extensions 10 underlie adjoining edges of adjacent units, and a suitable asphaltic cement (such as hot liquid bitumen, asphalt emulsion, or any other water-proofing and binding product) is spread upon the extensions or upon the overlying surfaces of the adjoining units, so that a good water-tight joint is formed between them. The cracks between the adjoining edges of adjacent units may be poured with a suitable hot liquid bitumen or water-proofing agent, as indicated at 15, to prevent moisture from collecting between the units. If desired, the units, when laid and cemented, either before or after pouring the joints with the bitumen at 15, may be rolled to smooth out, so far as possible, irregularities and to cause them to bend more or less, and to yield to conform to the curvature and irregularities of the channel of the ditch, and to insure good, tight contact over the entire surface of the extensions 10.

The edges of the units which overlie the extensions 10 of adjoining units are raised somewhat by the thickness of the extension 19, as may be seen in Figure 3, but this is not sufficient to detract materially from the general smoothness of the lining thus produced, and their interference to freedom of the water flow through the ditch is nothing as compared with the interference due to the natural roughness of ditches as now constructed, or to the obstructions caused by weeds and the like growing in the water. Indeed, one edge of each unit might be purposely made slightly thinner, if desired, but to do so is scarcely necessary, since the difference in elevation is slight, and since it may be made less abrupt and noticeable by the rolling or by the pouring of the joint filling material 15.

It may be desirable in some cases to provide a reinforcing web in the upper face as well as in the lower face of each unit, and to employ an extension of such an upper reinforcing web as a flap to overlie the top of an adjoining unit. Such a construction is shown in Figure 3, where the reinforcing web 16, with its extension 17, is shown in the upper surface of the unit. This upper reinforcing web may be constructed in substantially the same manner as the web 7 and may be similarly coated, but preferably it is coated with a bitumen approximating in toughness and penetration test the bitumen of the main layer 11, for this upper reinforcing web is exposed to damage by animals, by rocks, and by the water, hence this upper surface should be as tough and resistant to damage as is the unit which omits the top web.

The prevention of weed growth may be assisted by somewhat thickening the edge of the units which form the edge of the lining, at or above the water line. Thus as is indicated in Figure 2, the uppermost unit is thickened at its upper edge, as indicated at 18, and this thickened edge extends farther into the bank, and is overlaid, to some extent at least, with earth, but the earth is insufficient in depth to supply sufficient moisture and plant food to promote or permit the growth of weeds. The thickening also strengthens the edge of the lining, but its primary purpose is to deter weed growth, and to hold the weeds back as far as possible from the edge of the ditch, so that weed seeds may not as readily collect in the ditch, to be distributed with the water upon the cultivated land.

What we claim as our invention is:

1. A ditch lining or the like, comprising a plurality of substantially butted preformed slabs, each of a convenient size for handling, and each including an inelastic base sheet and a layer of compacted asphaltic mastic, the base sheet being incorporated in the lower face of the asphaltic mastic, to reinforce the slab and to resist rupture when the slab is bent, the base sheet at certain sides of the slab extending beyond the layer of mastic, and underlying an edge of an abutting slab, and means to cement the slabs together at their abutting edges, and the lapped edges of the base sheet and of adjoining slabs, to form of the whole an impervious, water-proof lining.

2. A preformed composite unit for use in lining ditches or the like, for placement in edge-abutting relationship with other like units, when cemented together at their abutting edges to constitute a continuous, impervious, waterproof lining which as a whole and locally is sufficiently flexible to be self-conforming to the curvature of the ditch and to surface irregularities, said composite unit comprising an impervious layer of asphaltic mastic, of such thickness, brittleness, and hardness that it would normally crack in its lower convex surface while thus conforming, cold, in use, yet sufficiently flexible to conform locally in time, and generally as part of the lining, and a sheet of burlap precoated with relatively soft and plastic bitumen and thereby made impervious and waterproof, bonded through the medium of its bitumen coating to the lower surface of the relatively hard and brittle mastic layer, the burlap sheet being substantially coextensive with this surface of the mastic layer in the zone of maximum tensile stress of the composite unit in bending, and to prevent the mastic layer from being unduly strained in tension or in shear, or to seal with the bitumen incipient cracks in the mastic layer.

3. The process of forming an integral, composite layer, ditch lining slab, which comprises centrally embedding a reinforcing web in high penetration test asphaltic base material incorporating fine aggregates, and compacting such material to form a thin, reinforced, impervious lower surface layer, spreading asphaltic aggregate material, in which the asphalt has a lower penetration test, upon the upper surface only of such lower surface layer, laid flat, and compacting the spread aggregate into a thick upper layer and thereby simultaneously surface bonding it to the first formed, impervious under layer by such compaction.

4. An integral, composite layer, preformed, ditch lining slab, comprising a thick surface-forming layer of normally hard, brittle, asphaltic material, and a relatively thin surface-forming layer of normally plastic and relatively soft bitumen impervious to water, intimately bonded together over their entire contacting area, and constituting a slab bendable when cold, after the material composing said two layers has set, to curve convexly the surface of the thin layer and concavely the surface of the thick layer, said relatively thin surface forming layer being yieldable during bending in the cold state sufficiently to remain impervious to water and to preserve said bond between said layers.

5. A trough-shaped ditch lining or the like, comprising a plurality of substantially butted preformed slabs, each including an upper layer of asphaltic material of such thickness, brittleness, and hardness that it would normally crack in its lower side during fabrication of the trough-shaped lining when bent cold after the material has set, and a relatively thin, sealing, surface-forming layer of relatively plastic and soft asphaltic material bonded to the under side of said upper layer, and having incorporated therein a flexible but inelastic reinforcing sheet, whereby as the edges of the slab bend upwardly during fabrication of the trough-shaped lining, the reinforcing sheet binds together the relatively thin layer and keeps it intact, while the plastic asphaltic material seals and prevents cracking of the slab's lower surface.

6. A preformed ditch lining unit, for placement in edge-abutting relationship with other like units, and when cemented thereto to constitute a trough-shaped continuous, impervious, water-proof lining which is slightly flexible to be self-conforming to surface contours and irregularities, said unit comprising an upper layer of compacted asphaltic material, of such thickness, brittleness, and hardness that it would normally crack in its lower side in bending during fabrication of the trough-shaped lining, yet sufficiently flexible to conform locally to surface contours, and a relatively thin, sealing, surface-forming layer of relatively plastic and soft asphaltic material bonded to the under side of said upper layer, and having incorporated therein a flexible but substantially non-extensible reinforcing sheet, whereby as the lower side of the upper layer is stressed in bending the tensile stresses are resisted by the substantially non-extensible reinforcing sheet incorporated in the relatively thin layer, while the bond between the layers is preserved and sealed by the plastic asphaltic material of said relatively thin layer, to prevent cracking and consequent leaking of the unit, yet the flexibility of the unit in conforming to surface contours is substantially unimpaired by said relatively thin layer.

7. A preformed, integral, composite layer ditch lining or the like, capable of conforming to curvatures and irregularities of the channel, comprising a thin, impervious sealing and flexible tensile, lower, surface-forming layer including a sheet of burlap embedded centrally in asphaltic composition in which the asphalt content has a high penetration test, and a relatively thick, hard, and brittle, upper layer of compacted asphaltic composition in which the asphalt content has a low penetration test, said two layers being surface bonded together below the lining's neutral zone in bending, said lower, surface-forming layer, when the lining is bent to fit the channel's contour, being in the zone of maximum tensile stress caused by such bending and relieving said upper layer from excessive tensile stress of bending.

8. A preformed slab bendable while cold, for joining to other like slabs to form a ditch lining or the like, comprising a thick surface-forming layer of normally hard, brittle asphaltic material, said layer being of increased thickness at one edge to form a ditch curb, and a relatively thin surface-forming layer of relatively soft and normally plastic bitumen impervious to moisture, intimately bonded to said first layer over the entire contacting area of said layers, and a reinforcing web centrally embedded in said soft and plastic surface layer.

9. A ditch lining slab bendable when cold, comprising an impervious layer of normally hard and brittle asphaltic material, of appreciable thickness, a relatively thin under surface-forming layer of relatively soft and normally plastic bitumen, impervious to moisture, surface bonded to the lower side of said first layer, and having incorporated therein a flexible but inextensible reinforcing web, and a second relatively thin upper surface-forming layer of soft and normally plastic bitumen, surface bonded to the upper side of said first layer, and also having incorporated therein a flexible reinforcing web.

10. A preformed composite unit for use in lining ditches or the like, for placement in edge-abutting relationship with other like units, when cemented together at their abutting edges to constitute a continuous, impervious, waterproof lining which as a whole and locally is sufficiently flexible to be self-conforming to the curvature of the ditch and to surface irregularities, said composite unit comprising an impervious layer of asphaltic mastic, of such thickness, brittleness, and hardness that it would normally crack in its lower convex surface while thus conforming, cold, in use, yet sufficiently flexible to conform locally in time, and generally as part of the lining, and a sheet of burlap precoated with relatively soft and plastic bitumen and thereby made impervious and waterproof, bonded through the medium of its bitumen coating to the lower surface of the relatively hard and brittle mastic layer, the burlap being substantially coextensive with this surface of the mastic layer in the zone of maximum tensile stress of the composite unit in bending, and to prevent the mastic layer from being unduly strained in tension or in shear, or to seal with the bitumen incipient cracks in the mastic layer, and the burlap sheet extending beyond certain edges of the unit, to underlap the abutting edges of adjoining units, and to contain a sealing compound placed between said abutting edges.

11. The method of forming a ditch lining slab, which comprises preparing sufficient normally hard, brittle asphaltic material to form a thick slab layer, preparing sufficient normally plastic and relatively soft asphaltic material to form a relatively thin slab layer, heating and compacting into a flat layer one of said materials, compacting upon one side only of said first layer the other material, after being heated, into a second flat layer, and simultaneously intimately bonding together said two layers over their entire area of contact to form therefrom an integral, composite, flat slab, and allowing the material of both layers to cool and to set while retained in flat condition.

JOHN T. R. McCORKLE.
EDWIN V. BERG.